United States Patent
Lv et al.

(10) Patent No.: US 10,345,815 B2
(45) Date of Patent: Jul. 9, 2019

(54) MOTION PLANNING AND INTENTION PREDICTION FOR AUTONOMOUS DRIVING IN HIGHWAY SCENARIOS VIA GRAPHICAL MODEL-BASED FACTORIZATION

(71) Applicant: QUALCOMM Incorporated, San Diego, CA (US)

(72) Inventors: Zhaoyang Lv, Smyrna, GA (US); Aliakbar Aghamohammadi, San Diego, CA (US); Amirhossein Tamjidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 74 days.

(21) Appl. No.: 15/601,047

(22) Filed: May 22, 2017

(65) Prior Publication Data
US 2018/0074505 A1    Mar. 15, 2018

Related U.S. Application Data

(60) Provisional application No. 62/394,591, filed on Sep. 14, 2016.

(51) Int. Cl.
*G05D 1/02*      (2006.01)
*B60W 30/12*    (2006.01)
(Continued)

(52) U.S. Cl.
CPC ........... *G05D 1/0214* (2013.01); *B60W 30/12* (2013.01); *G01C 21/28* (2013.01);
(Continued)

(58) Field of Classification Search
CPC .. G05D 1/0214; G05D 1/0289; G05D 1/0088; G05D 1/0246; G05D 1/0295;
(Continued)

(56) References Cited

U.S. PATENT DOCUMENTS 8,903,588 B2    12/2014  Schmuedderich et al.
9,227,632 B1 *   1/2016  Lee .................. B60W 30/0953
(Continued)

FOREIGN PATENT DOCUMENTS

DE    102011012793 A1    9/2012
EP        2950294 A1    12/2015
(Continued)

OTHER PUBLICATIONS

International Search Report and Written Opinion—PCT/US2017/046795—ISA/EPO—dated Nov. 29, 2017.

*Primary Examiner* — Yuen H Wong
(74) *Attorney, Agent, or Firm* — Kilpatrick Townsend & Stockton (57) ABSTRACT

Aspects of the disclosure are related to a method, apparatus, and system for planning a motion for a first vehicle, comprising: estimating past states of an observed second vehicle based on sensor inputs; predicting a future trajectory of the second vehicle based on the estimated past states; planning a future trajectory of the first vehicle based on the predicted future trajectory of the second vehicle and a safety cost function; and driving the first vehicle to follow the planned trajectory.

24 Claims, 5 Drawing Sheets

(51) Int. Cl.
*G05D 1/00* (2006.01)
*G01C 21/28* (2006.01)
*G01C 21/34* (2006.01)
*G08G 1/16* (2006.01)

(52) U.S. Cl.
CPC ....... *G01C 21/3407* (2013.01); *G05D 1/0088* (2013.01); *G05D 1/0246* (2013.01); *G05D 1/0289* (2013.01); *G05D 1/0295* (2013.01); *G05D 2201/0213* (2013.01); *G08G 1/166* (2013.01); *G08G 1/167* (2013.01)

(58) Field of Classification Search
CPC ........ G05D 2201/0213; G01C 21/3407; G01C 21/28; B60W 30/12; G08G 1/166; G08G 1/167
See application file for complete search history.

(56) References Cited

U.S. PATENT DOCUMENTS

| | | | |
|---|---|---|---|
| 9,244,462 | B2 | 1/2016 | Pedersen |
| 9,248,834 | B1 | 2/2016 | Ferguson et al. |
| 2004/0090117 | A1 | 5/2004 | Dudeck et al. |
| 2005/0021226 | A1* | 1/2005 | Kustosch ........... G01C 21/3697 701/466 |
| 2012/0262284 | A1 | 10/2012 | Irrgang et al. |
| 2014/0336844 | A1 | 11/2014 | Schwindt et al. |
| 2016/0091897 | A1 | 3/2016 | Nilsson et al. |
| 2016/0214647 | A1 | 7/2016 | Weisswange et al. |

FOREIGN PATENT DOCUMENTS

| | | |
|---|---|---|
| EP | 2990290 A1 | 3/2016 |
| WO | 2010000521 A1 | 1/2010 |

* cited by examiner

MOTION PLANNING AND INTENTION PREDICTION FOR AUTONOMOUS DRIVING IN HIGHWAY SCENARIOS VIA GRAPHICAL MODEL-BASED FACTORIZATION

CROSS REFERENCE TO RELATED APPLICATIONS

The present application claims priority to U.S. Provisional Patent Application No. 62/394,591, filed Sep. 14, 2016, entitled "MOTION PLANNING AND INTENTION PREDICTION FOR AUTONOMOUS DRIVING IN HIGHWAY SCENARIOS VIA GRAPHICAL MODEL-BASED FACTORIZATION," the content of which is hereby incorporated by reference in its entirety for all purposes.

FIELD

The subject matter disclosed herein relates to electronic devices and automotive vehicles, and more particularly to methods, apparatuses, and systems for planning a trajectory for an autonomous vehicle.

BACKGROUNDS

An autonomous vehicle may need to plan a safe trajectory for itself based on its environment. The problem may be referred to as motion planning, and the vehicle doing the planning may be referred to as the host vehicle. For various reasons, motion planning may be a challenging problem for a host vehicle traveling on a highway. For example, the environment may be highly dynamic as the observed other vehicles may be moving fast. In order to avoid collision, the host vehicle may need to estimate the other vehicles' current position as well as predict their future intentions or trajectories. At the same time, the host vehicle may also be traveling at a high speed (e.g., 25-30 m/s) itself. Therefore, motion planning may require taking into account the complex environment as well as the goal of the host vehicle (e.g., the host vehicle may need to take the next highway exit).

Further, in addition to collision avoidance, there may be other desired objectives in the motion planning problem. For example, it may be preferable to have a planned trajectory that can be effectuated with a smooth control signal in order to improve efficiency.

SUMMARY

One aspect of the disclosure is directed to a method for planning a motion for a first vehicle, comprising: estimating past states of an observed second vehicle based on sensor inputs; predicting a future trajectory of the second vehicle based on the estimated past states; planning a future trajectory of the first vehicle based on the predicted future trajectory of the second vehicle and a safety cost function; and driving the first vehicle to follow the planned trajectory.

DETAILED DESCRIPTION

Figure 1:
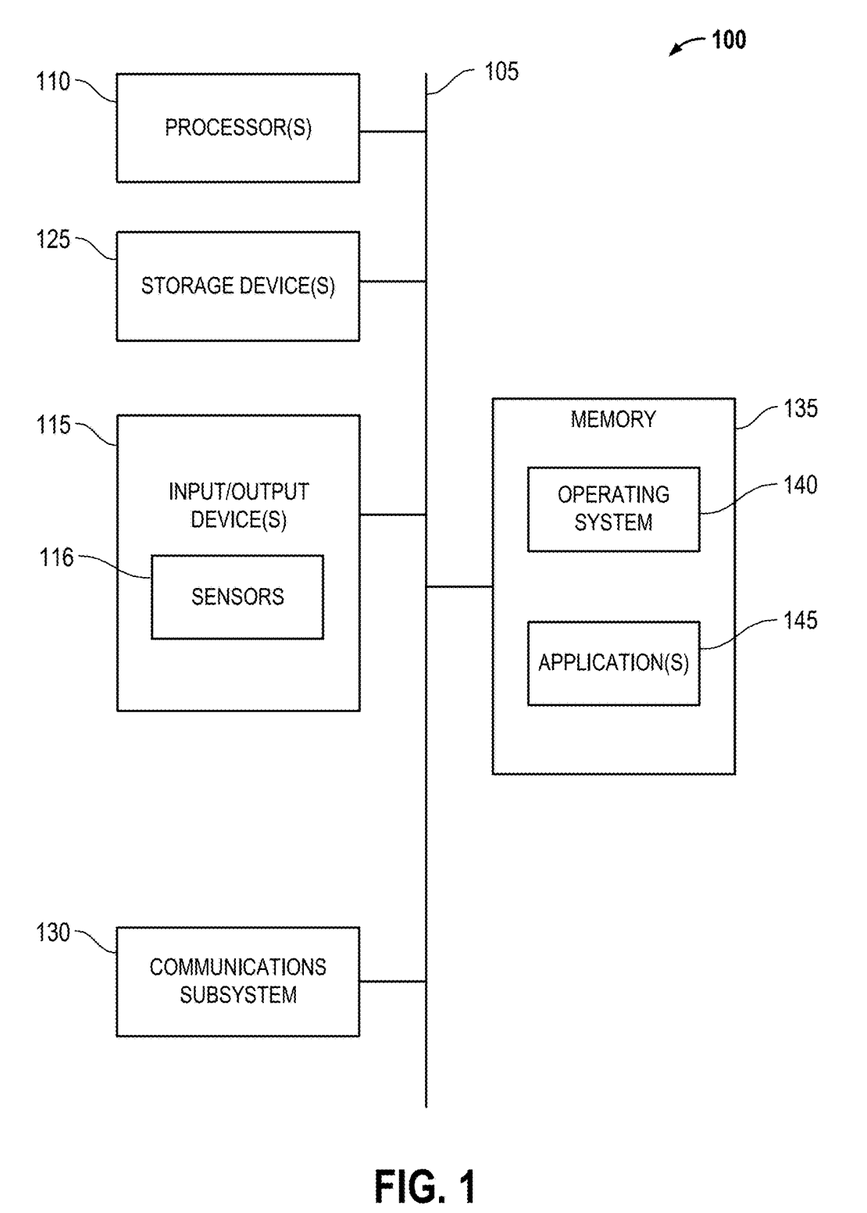
FIG. 1 is a block diagram illustrating an example onboard system installed in an automotive vehicle and adapted for planning a trajectory for the automotive vehicle.

Referring to FIG. 1, an example onboard system 100 installed in an automotive vehicle and adapted for planning a trajectory for the automotive vehicle, according to one embodiment of the disclosure, is shown. The automotive vehicle may be a non-autonomous, semi-autonomous (e.g., semi-self-driving), or autonomous (e.g., self-driving) vehicle. The onboard system 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input/output devices 115 comprising one or more sensors 116, as well as a mouse, a keyboard, a display, a speaker, and/or the like. The sensors 116 may comprise a proximity sensor, a camera, etc. The sensors 116 may further comprise one or more of: a gyroscope, an accelerometer, a magnetometer, or any combination thereof.

The onboard system 100 may further include (and/or be in communication with) one or more non-transitory storage devices 125, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including without limitation, various file systems, database structures, and/or the like.

The onboard system 100 might also include a communication subsystem 130, which can include without limitation a modem, a network card (wireless or wired), an infrared communication device, a wireless communication device and/or chipset (such as a Bluetooth device, an 802.11 device, a Wi-Fi device, a WiMAX device, cellular communication facilities, etc.), and/or the like. The communications subsystem 130 may permit data to be exchanged with a network, other computer systems/devices, and/or any other devices described herein. In many embodiments, the onboard system 100 will further comprise a working memory 135, which can include a RAM or ROM device, as described above.

The onboard system 100 also can comprise software elements, shown as being currently located within the working memory 135, including an operating system 140, device drivers, executable libraries, and/or other code, such as one or more application programs 145, which may comprise or may be designed to implement methods, and/or configure systems, provided by other embodiments, as described herein. Merely by way of example, one or more procedures described with respect to the method(s) discussed below might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 125 described above. In some cases, the storage medium might be incorporated within a computer device, such as the onboard system 100. In other embodiments, the storage medium might be separate from a computer device (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the onboard system 100 and/or might take the form of source and/or installable code, which, upon compilation and/or installation on the onboard system 100 (e.g., using any of a variety of generally available compilers, installation programs, compression/decompression utilities, etc.), then takes the form of executable code.

In one embodiment, it may be assumed that each observed vehicle has one of the three possible intentions: keeping moving forward in the current lane, switching to the left lane, or switching to the right lane. Each possible intention may be associated with a probability. In one embodiment, it may be assumed that an observed vehicle may accomplish a lane switching in three steps: 1) changing the speed (either acceleration or deceleration) while continuing to travel in the current lane (e.g., in a straight line trajectory parallel to the road topology), 2) switching into the new lane at a constant forward speed, and 3) changing the speed (either acceleration or deceleration) after having switched into the new lane (e.g., in a straight line trajectory parallel to the road topology). The step of switching into the new lane at a constant forward speed may be modeled with a 3rd order polynomial. Therefore, the trajectory associated with each possible intention may be modeled with a cubic spline, and for intentions involving lane switching, each segment of the spline may correspond to one of the steps described above.

The future intention of an observed vehicle may be estimated probabilistically based on various factors. These factors may include direct measurements indicative of the future intention (e.g., a left/right turn signal may indicate an intention to switch into the lane to the left/right), indirect measurements indicative of the future intention (e.g., an estimated trajectory corresponding to a lane change to the left/right), or prior knowledge (e.g., road constraints such as a road sign directing vehicles to a particular direction).

In one embodiment, given poses of observed other vehicles and the goal of the host vehicle, parameters of the future trajectory corresponding to each vehicle including the host vehicle may be solved as a maximum likelihood estimation.

In one embodiment, factors that evaluate the likelihood of collision (e.g., a collision cost) may be included in the future trajectory estimation so that a host vehicle trajectory that minimizes the collision cost may be determined. Further, factors that evaluate the rate of velocity and/or steering angle change in consecutive steps (e.g., a controller cost) may be included in the future trajectory estimation so that a host vehicle trajectory that corresponds to a smooth control signal may be determined. Uncertainty may be accounted for in each factor. The uncertainty of each factor may affect the final uncertainty of the optimal trajectory determined for the host vehicle according to the chain rule.

Notations and Problem Formulation

In one embodiment, the maximum likelihood of a joint probability density function (PDF) may be calculated to 1) estimate past trajectories, 2) predict future trajectories of other vehicles, and 3) plan the future trajectory (motion) for the host vehicle: $(X_{1:k}^*, X_{k+1:T}^*, L^*, \tau^*) = \text{argmax } P(X_{1:k}, X_{k+1:T}, Z_{1:k}, L, \tau | R)$, where k is the current time step, $X_{1:k}$ is the state history up to the timestamp k, $X_{k+1:T}$ is the predicted future state until horizon T, $Z_{1:k}$ is the measurement history up to timestamp k, $L = f_L(X)$ is the low-dimensional representation of trajectory parameters/features of the other vehicle, $\tau = f_\tau(X^{host})$ is the low-dimensional representation of the planned trajectory parameters/features of the host vehicle, R is the road structure (e.g., prior information), argmax stands for arguments of the maxima, and $P((|))$ denotes the (conditional) probability. Although the above embodiment has been described with reference to only one other vehicle, it should be appreciated that the number of other vehicles in the environment does not limit the disclosure and a person skilled in the art should be able to adapt the embodiment to account for more surrounding vehicles without deviating from the disclosure.

Figure 2:
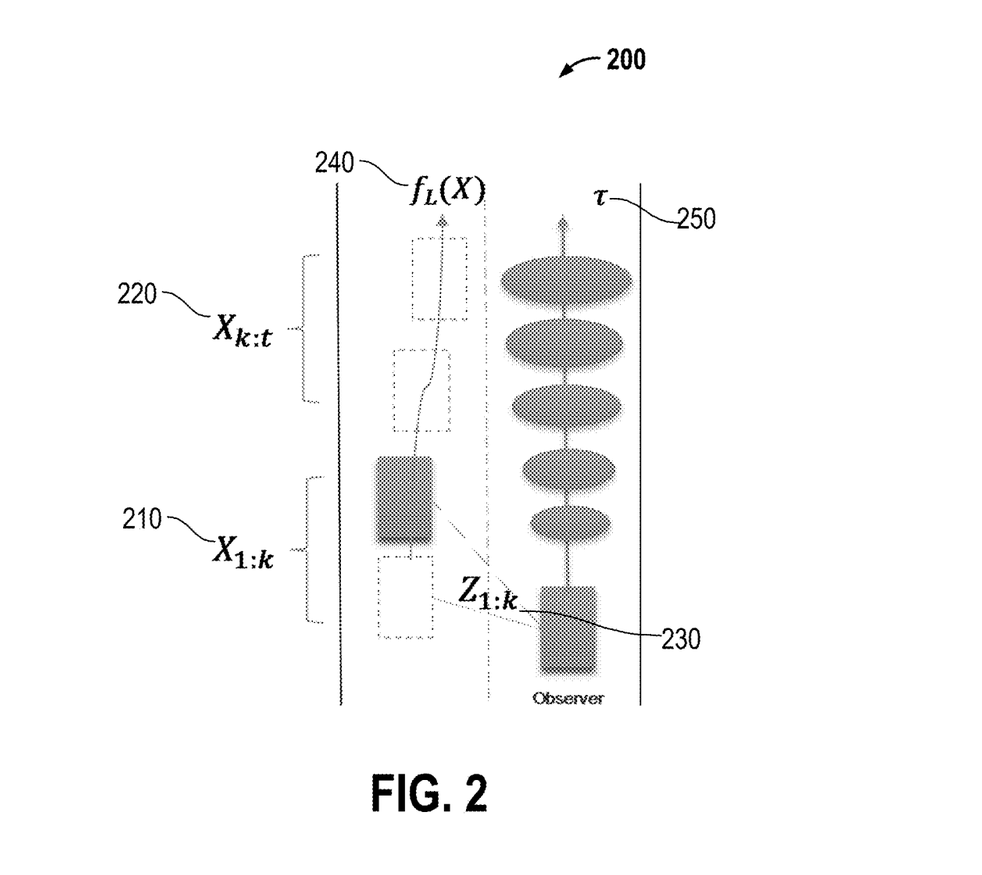
FIG. 2 is a diagram illustrating various parameters according to embodiments of the disclosure.

Referring to FIG. 2, a diagram 200 illustrating various parameters according to embodiments of the disclosure is shown. FIG. 2 illustrates the state history up to the timestamp k, $X_{1:k}$ 210, the predicted future state until horizon T, $X_{k+1:T}$, 220, the measurement history up to timestamp k, $Z_{1:k}$, 230, the low-dimensional representation of trajectory parameters/features of the other vehicle, $f_L(X)$, 240, and the low-dimensional representation of the planned trajectory parameters/features of the host vehicle, $\tau$, 250.

Parameters for the Vehicle State

A vehicle's state X at time k can be described by its pose $p = (x, y, \theta)$, its velocity v, and its steering angle $\alpha$, where x and y are coordinates in a two-dimensional coordinate system, and $\theta$ is the heading angle of the vehicle. Each pose of the vehicle may be assumed to lie on a 3rd-order polynomial, which is one segment of a cubic spline. All the three-dimensional (3D) poses in the same segment share the same parameters for the $y = f_\tau(x; a_1, a_2, a_3, a_4)$, which is a five-dimensional (5D) manifold. The pose may therefore be described as $p = (x, f_\tau(x), \tan^{-1}(f_\tau'(x)))$.

When the vehicle changes the lane on a highway, the sideways movement, compared to the forward movement, may be very small (e.g., less than 0.1 times the forward movement) in most cases. Therefore, it may be safely assumed that the velocity of the vehicle is a one-dimensional manifold (e.g., parallel to the road structure).

Trajectory Parameters

The trajectory intention may comprise three parts. During the lane change, the trajectory may be defined as a 3rd-order polynomial function. The parameters that need to be estimated are the lane change starting point $x_p$, the lane change end point $x_q$, the lane change polynomial $f_P(a_1, a_2, a_3, a_4)$, and the lane change velocity $v_{est}$. Given the current vehicle position $x_{start}$, the current velocity $v_{start}$, and the target point including a target position $x_{end}$ and a target velocity $v_{end}$, the future trajectory may be solved for as follows: 1) before the lane change at the point $x_p$: the vehicle smoothly changes the velocity from the current velocity $v_{start}$ to the lane change velocity $v_{est}$; 2) during the lane change: the vehicle follows the polynomial $f_P(a_1, a_2, a_3, a_4)$ to the point $x_q$; 3) after the lane change: the vehicle smoothly changes the velocity from the lane change velocity $v_{est}$ to the target velocity $v_{end}$.

Figure 3:
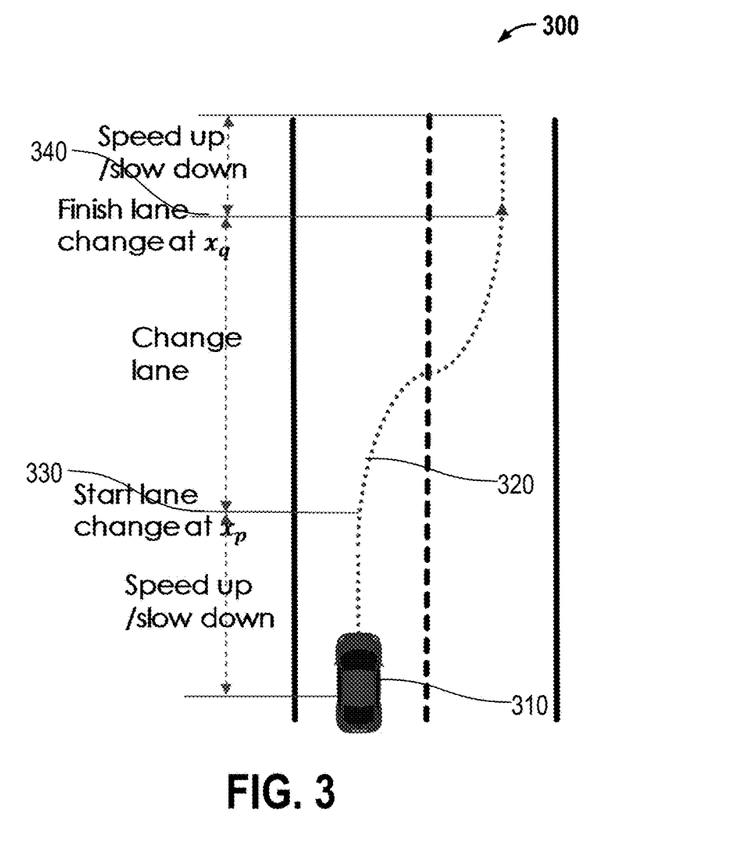
FIG. 3 is a diagram illustrating various parameters according to embodiments of the disclosure.

Referring to FIG. 3, a diagram 300 illustrating various parameters according to embodiments of the disclosure is shown. FIG. 3 illustrates a trajectory 320 of a vehicle 310 performing a lane change. The vehicle 310 begins to change the lane at the lane change starting point $x_p$ 330 and completes the lane change at the lane change end point $x_q$ 340.

Problem Decomposition

The joint estimation problem may be decomposed into three stages: $P(X_{1:k}, X_{k:T}, Z_{1:k} L, \tau | R) = P(\tau | L, R) P(L | X_{1:T}, R) P(X_{k:T} | R) P(Z_{1:k} | X_{1:k}) P(X_{1:k} | R) \propto P(L | \tau, R) P(\tau | R) P(L | X_{1:T}, R) P(Z_{1:k} | X_{1:k}) P(X_{1:k} | R) = P(L | \tau, R) P(\tau | R) P(L | X_{1:T}, R) P(X_{k:T} | R) \Pi_{i=1}^{K} P(x_i | x_{i-1}) P(z_i | x_i)$, where $\propto$ denotes direct proportionality, and where $P(L | \tau, R) P(\tau | R)$ corresponds to the likelihood of planning the host vehicle behavior, $P(L | \tau, R) P(\tau | R)$ corresponds to the likelihood of predicting the other vehicles' behavior, and $\Pi_{i=1}^{K} P(x_i | x_{i-1}) P(z_i | x_i)$ corresponds to the likelihood of sensor fusion. The three stages may be approximately solved in a sequential order, as will be explained in detail below.

Factor Graph Representation

A factor graph may be used to describe the relationships in terms of factors. In particular, in the sensor fusion stage $\Pi_{i=1}^{K} P(x_i | x_{i-1}) P(z_i | x_i)$, $P(x_i | x_{i-1}) \propto f(x_i, x_{i-1})$, which may be referred to as the motion factor, and $P(z_j | x_i) \propto f(z_j, x_i)$, which may be referred to as the measurement factor. In the stage for the prediction of the other vehicles' behavior $P(L | \tau, R) P(\tau | R)$, $P(L | x_i) \propto f(L, x_i)$, which may be referred to as the trajectory fitting factor. Moreover, in the stage for the planning of the host vehicle behavior $P(L | \tau, R) P(\tau | R)$, $P(\tau) \propto f(\tau)$, which may be referred to as the prior factor about self-intention, and $P(L | \tau) \propto f(L, \tau)$, which may be referred to as the collision factor with the other vehicles. It should be noted that the term R has been dropped for convenience because it may be assumed to be a constant prior over each factor. It should be appreciated that more factors may be added to take into account more complex scenarios.

Sensor Fusion Factors

Sensor fusion factors may comprise factors based on the vehicle motion model and the measurement model. In one embodiment, the sensor fusion factors may be $\Sigma_i^K f(x_i, x_{i-1}) + \Sigma_j^N f(z_j, x_i)$. The past states may be estimated based on measurements. The motion model may depend on road priors. The motion state may be estimated with simultaneous localization and mapping (SLAM) methods.

Factors for the Prediction of the Other Vehicles' Behavior

The future trajectories of the other vehicles may be predicted based on road priors and may be correlated to their past states and the road structure. In one embodiment, the factors for the prediction of the other vehicles' behavior may be $\Sigma_i^K f(L, x_i)$.

Factors for the Planning of the Host Vehicle Behavior

The parameters that need to be estimated are the lane change velocity v and the trajectory polynomial $f_\tau(a_1, a_2, a_3, a_4)$. Other vehicles' trajectories may be estimated with a similar factor graph but with fewer factors because there is more control information available about the host vehicle than about the other vehicles.

Factors for Future Trajectory Fitting Based on Intention Modeling

The trajectory corresponding to each intention may be modeled with a 3rd order polynomial: $y = f_\tau(x; a_1, a_2, a_3, a_4)$. For a single pose $p = (x, y, \theta)$, two factors may be set up: 1) the Y axis deviation factor: $y = f_\tau(x) + \sigma_y = a_1 + a_2 * x + a_3 * x^2 + a_4 * x^3 + \sigma_y$, and 2) the angular deviation factor: $\theta = \tan^{-1}(f_\tau'(x)) + \sigma_\theta = \tan^{-1}(a_2 + 2*a_3 x + 3 a_4 x^2) + \sigma_\theta$, where $\sigma_y$ and $\sigma_\theta$ are the uncertainty of the factors, respectively. Similar factors may be added for a target pose. In particular, a small $\sigma_\theta$ may be set when the vehicle is expected to be parallel to the road when the lane change is complete, and $\sigma_y$ may be set based on the confidence associated with the final target.

The Factor for Collision Avoidance

At time t, the distance between the host vehicle p and another vehicle p' may be described as: $d_t = \|p - p'\|$. A safe distance threshold $D_{safe}$ requires that $d_t > D_{safe}$. Thus, to model the factor for collision avoidance as a Gaussian noise factor with an uncertainty, the factor of the truncated unsafe cost $\xi$ may be evaluated as:

$$\xi_t = \begin{cases} D_{safe} - d_t + \sigma_\xi, & d_t < D_{safe} \\ 0, & d_t \geq D_{safe} \end{cases}.$$

To evaluate the likelihood that a path may be unsafe, the collision probability in each sampled point may be assumed to be independent over the two trajectories.

Figure 4:
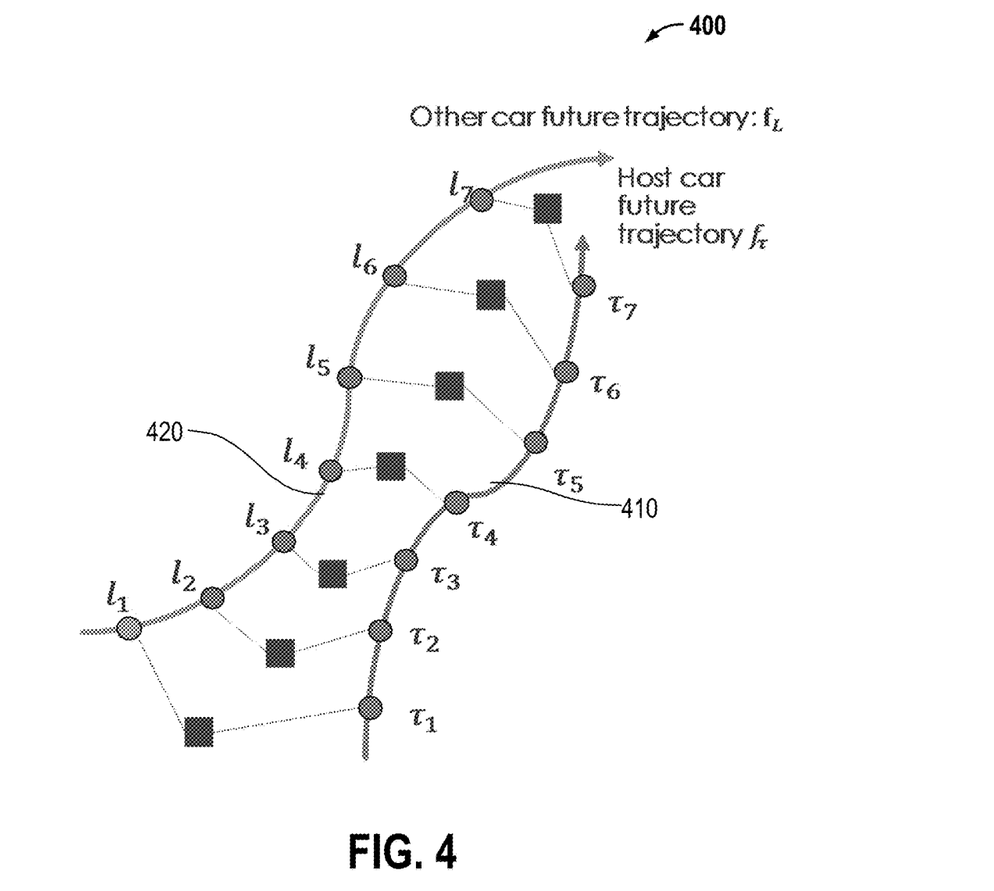
FIG. 4 is a diagram illustrating various parameters according to embodiments of the disclosure.

Referring to FIG. 4, a diagram 400 illustrating various parameters according to embodiments of the disclosure is shown. FIG. 4 illustrates a planned future trajectory 410 of the host vehicle p and a predicted future trajectory 420 of the other vehicle p'.

Factors for Smooth Control

A vehicle's velocity v may be approximated as $v_t = x_t - x_{t-1}$. A velocity smoothness factor at consecutive time points may be defined as $v_t = v_{t-1} + \sigma_v$. The relationship between the steering angle $\alpha$ and the trajectory of the host vehicle $f_\tau(x)$ may be described as:

$$\kappa = \frac{\tan \alpha}{D}, \text{ and} \quad 1)$$

$$\kappa = \frac{|f_\tau''(x)|}{(1 + f_\tau'(x)^2)^{\frac{3}{2}}}, \quad 2)$$

where $\kappa$ is the curvature at point x, and D is the distance between the front wheels and the back wheels of the vehicle. Thus, the steering angle may be defined as $\alpha_t = f_\alpha(x_t)$, and a steering angle smoothness factor may be described as $\alpha_t = \alpha_{t-1} + \sigma_\alpha$.

Prediction of Future Trajectories of Other Vehicles

The future trajectory $f_L$ of a vehicle may be predicted based on the trajectory fitting factors of that vehicle: $L = \arg\min \Sigma_{t \in [1:T]} \|y_t - f_L(x_t)\|_{\Sigma_x}^2 + \Sigma_{y \in [1:T]} \|\theta_t - \tan^{-1}(f_L'(x_t))\|_{\Sigma_\theta}^2$ (Equation 1), where $x_t$, $y_t$, and $\theta_t$ are the observed motions of the vehicle, $\|\cdot\|_{\Sigma}^2$ is the Mahalanobis distance with a covariance $\Sigma$, and argmin stands for argument of the minimum.

The problem may be solved as a least-square problem using the Gauss-Newton method. Due to the non-linearity in the problem, Levenberg-Marquardt method may be used if the problem is ill-conditioned numerically. Two poses may be randomly sampled in the vehicle's feasible state, and the parameters may be solved for as an initialization of the method. The four factors will result in four equations, based on which it is numerically feasible to solve for the four parameters of the 3rd order (4 degrees of freedom) polynomial.

Planning of the Host Vehicle's Motion

The motion of the host vehicle may be planned based on all factors: $(\tau, v) = \arg\min \Sigma_{t \in [k,T]} \|y_t - f_\tau(x_t)\|_{\Sigma_x}^2 + \Sigma_{t \in [k,T]} \|\theta_t - \tan^{-1}(f_L(x_t))\|_{\Sigma_\theta}^2 + \Sigma_{t \in [k,T]} \|v_t - v_{t-1}\|_{\Sigma_v}^2 + \Sigma_{t \in [k,T]} \|\alpha_t - \alpha_{t-1}\|_{\Sigma_\alpha}^2 + \Sigma_j \Sigma_{t \in [k,T]} \|\xi_{t,j}\|_{\Sigma_\xi}^2$ (Equation 2), where $f_\tau$ is the polynomial associated with the planned trajectory of the host vehicle, and $\xi_{t,j}$ is the truncated safety cost between the host vehicle and another vehicle j at the time t. Equation 2 may be solved with the Gauss-Newton method, or the Levenberg-Marquardt method as described above.

Therefore, factors for sensor fusion, factors for the predicted future trajectories of other vehicles, and the factors for the planned future trajectory of the host vehicle may be solved for sequentially, in that order. In one embodiment, for the sensor fusion factors, the unknown past states $X_{1:k}$ may be estimated based on measurements $Z_{1:k}$ using the least-square method. For the factors for the predicted future trajectories of other vehicles, a vehicle trajectory $L=f_L(X)$ may be predicted based on estimated past states $X_{1:k}$ using Equation 1, and the future states $X_{k+1:T}$ may be estimated based on the predicted trajectory $L=f_L(X)$. For the factors for the planned future trajectory of the host vehicle, the trajectory of the host vehicle $\tau=f_\tau(X^{host})$ may be planned based on the state of the host vehicle and the other vehicle's trajectory L using Equation 2.

Figure 5:
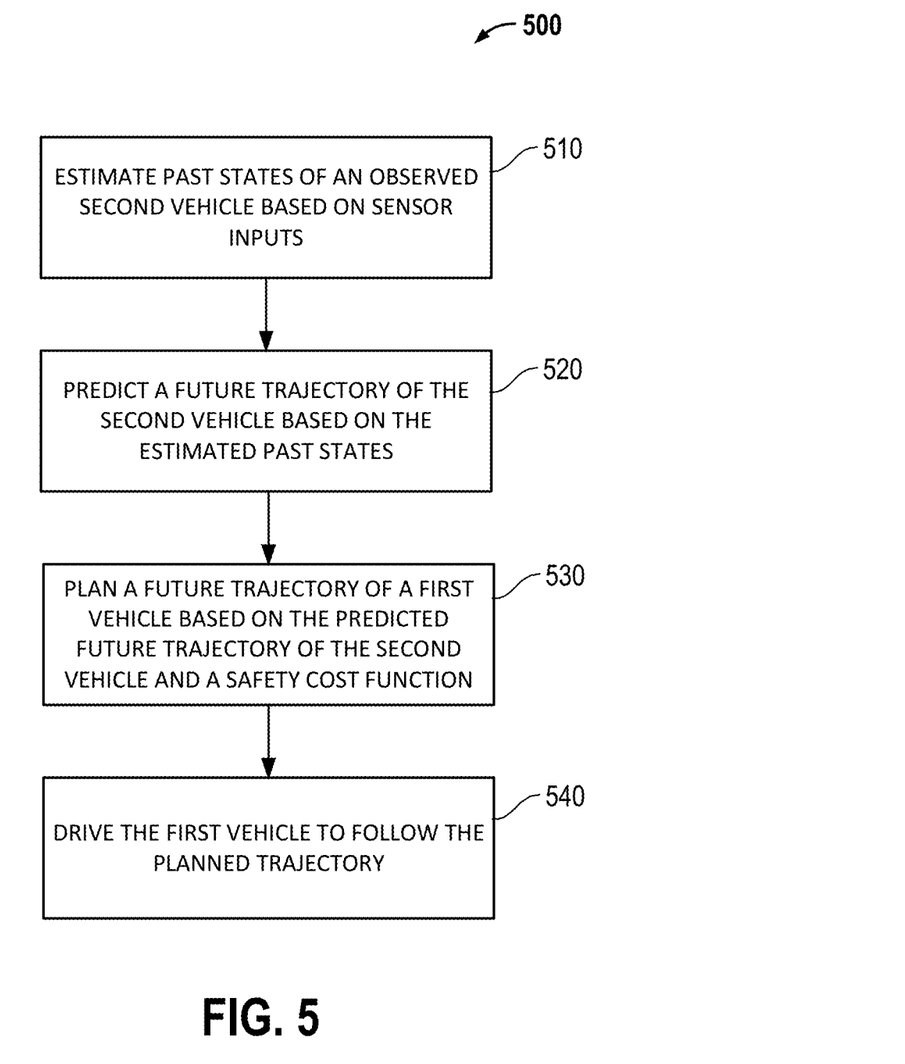
FIG. 5 is a flowchart illustrating an example method for planning the motion of a first vehicle.

Referring to FIG. 5, a flowchart illustrating an example method 500 for planning the motion of a first vehicle is shown. At block 510, past states of an observed second vehicle may be estimated based on sensor inputs. The sensor may be a camera, a proximity sensor, etc. At block 520, the future trajectory of the second vehicle may be predicted based on the estimated past states. The trajectory may be modeled with a cubic spline comprising a 3rd order polynomial. The future trajectory of the second vehicle may be predicted based further on a road structure. At block 530, the future trajectory of the first vehicle may be planned based on the predicted future trajectory of the second vehicle and a safety cost function. The planned future trajectory of the first vehicle may be modeled with a cubic spline comprising a 3rd order polynomial. The future trajectory of the first vehicle may be planned based further on a control smoothness factor, or the road structure, or any combination thereof. At block 540, the first vehicle may be driven to follow the planned trajectory.

One embodiment of the disclosure is directed to a first vehicle apparatus comprising: one or more sensors 116 configured to detect road and vehicle parameters; a memory 135 configured to store code and data; and a processor 110 coupled to the memory 135, the processor 110 configured to: estimate past states of an observed second vehicle based on sensor inputs, predict a future trajectory of the second vehicle based on the estimated past states, plan a future trajectory of a first vehicle based on the predicted future trajectory of the second vehicle and a safety cost function, and drive the first vehicle to follow the planned trajectory.

Therefore, embodiments of the disclosure are related to a method, apparatus, and system for solving a complex motion planning problem for a host vehicle using a graphical model-based factorization approach. A host vehicle traveling on a highway with multiple other vehicles in the vicinity may benefit from embodiments of the disclosure. The intentions and future trajectories of surrounding vehicles may be estimated. Factors that evaluate a collision cost and/or a controller cost may be included in the trajectory estimation. Prior information may also be incorporated. It has been contemplated that more factors, such as road structure information, additional measurements, etc., may also be included without change to the general framework of the embodiments.

Embodiments of the disclosure may work in scenarios where multiple surrounding vehicles travel at high speeds and where other moving and/or stationary objects also exist in the environment, may be reasonably fast, and may incur only modest computational costs including memory usage. Different uncertainties for different factors may be accounted for. The uncertainty of the determined optimal trajectory and its associated controller policy may be provided. The information may be used either for autonomous self-driving or for assisting a human driver.

Various implementations of an apparatus, method, and system for adjusting content of a display to help alleviate or prevent motion sickness have been previously described in detail. It should be appreciated that application or system that completes the relevant operations may be implemented as software, firmware, hardware, combinations thereof, etc. In one embodiment, the previous described functions may be implemented by one or more processors (e.g., processor 110) of an onboard system 100 to achieve the previously desired functions (e.g., the method operations of FIG. 5).

Example methods, apparatuses, or articles of manufacture presented herein may be implemented, in whole or in part, for use in or with mobile communication devices. As used herein, "mobile device," "mobile communication device," "hand-held device," "tablets," etc., or the plural form of such terms may be used interchangeably and may refer to any kind of special purpose computing platform or device that may communicate through wireless transmission or receipt of information over suitable communications networks according to one or more communication protocols, and that may from time to time have a position or location that changes. As a way of illustration, special purpose mobile communication devices, may include, for example, cellular telephones, satellite telephones, smart telephones, heat map or radio map generation tools or devices, observed signal parameter generation tools or devices, personal digital assistants (PDAs), laptop computers, personal entertainment systems, e-book readers, tablet personal computers (PC), personal audio or video devices, personal navigation units, wearable devices, or the like. It should be appreciated, however, that these are merely illustrative examples relating to mobile devices that may be utilized to facilitate or support one or more processes or operations described herein.

The methodologies described herein may be implemented in different ways and with different configurations depending upon the particular application. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

The herein described storage media may comprise primary, secondary, and/or tertiary storage media. Primary storage media may include memory such as random access memory and/or read-only memory, for example. Secondary storage media may include mass storage such as a magnetic or solid-state hard drive. Tertiary storage media may include removable storage media such as a magnetic or optical disk, a magnetic tape, a solid-state storage device, etc. In certain implementations, the storage media or portions thereof may be operatively receptive of, or otherwise configurable to couple to, other components of a computing platform, such as a processor.

In at least some implementations, one or more portions of the herein described storage media may store signals representative of data and/or information as expressed by a particular state of the storage media. For example, an electronic signal representative of data and/or information may be "stored" in a portion of the storage media (e.g., memory) by affecting or changing the state of such portions of the storage media to represent data and/or information as binary information (e.g., ones and zeros). As such, in a particular implementation, such a change of state of the portion of the storage media to store a signal representative of data and/or information constitutes a transformation of storage media to a different state or thing.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "identifying", "determining", "establishing", "obtaining", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general-purpose computer once it is programmed to perform particular functions pursuant to instructions from program software.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in some implementations" or other like phrases in various places throughout this specification are not necessarily all referring to the same feature, example, and/or limitation. Furthermore, the particular features, structures, or characteristics may be combined in one or more examples and/or features.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended claims, and equivalents thereof.

What is claimed is:

1. A method for planning a motion for a first vehicle, comprising:
    by one or more processors, estimating past states of an observed second vehicle based on sensor inputs;
    by the one or more processors, predicting a future trajectory of the second vehicle based on the estimated past states;
    by the one or more processors, planning a future trajectory of the first vehicle based on the predicted future trajectory of the second vehicle and a safety cost function; and
    by the one or more processors, driving the first vehicle to follow the planned trajectory,
    wherein the planned trajectory includes an estimated lane change velocity.

2. The method of claim 1, wherein the future trajectory of the second vehicle is modeled with a cubic spline comprising a 3rd order polynomial.

3. The method of claim 1, wherein the predicting a future trajectory of the second vehicle is based further on a road structure.

4. The method of claim 1, wherein the future trajectory of the first vehicle is modeled with a cubic spline comprising a 3rd order polynomial.

5. The method of claim 1, wherein the future trajectory of the first vehicle is planned based further on at least one of a control smoothness factor, or a road structure, or any combination thereof.

6. The method of claim 1, wherein the driving the first vehicle includes:
    before a lane change, changing a velocity of the first vehicle from a start velocity to the estimated lane change velocity; and
    after the lane change, changing the velocity of the first vehicle from the estimated lane change velocity to a target velocity.

7. A first vehicle apparatus for planning a motion, comprising:
    one or more sensors configured to detect road and vehicle parameters;
    a memory configured to store code and data;
    a processor coupled to the memory, the processor configured to:
        estimate past states of an observed second vehicle based on sensor inputs;
        predict a future trajectory of the second vehicle based on the estimated past states;

plan a future trajectory of the first vehicle based on the predicted future trajectory of the second vehicle and a safety cost function; and drive the first vehicle to follow the planned trajectory, wherein the planned trajectory includes an estimated lane change velocity.

8. The first vehicle apparatus of claim 7, wherein the future trajectory of the second vehicle is modeled with a cubic spline comprising a 3rd order polynomial.

9. The first vehicle apparatus of claim 7, wherein the predicting a future trajectory of the second vehicle is based further on a road structure.

10. The first vehicle apparatus of claim 7, wherein the future trajectory of the first vehicle is modeled with a cubic spline comprising a 3rd order polynomial.

11. The first vehicle apparatus of claim 7, wherein the future trajectory of the first vehicle is planned based further on at least one of a control smoothness factor, or a road structure, or any combination thereof.

12. The first vehicle apparatus of claim 7, wherein the driving the first vehicle includes:
    before a lane change, changing a velocity of the first vehicle from a start velocity to the estimated lane change velocity; and
    after the lane change, changing the velocity of the first vehicle from the estimated lane change velocity to a target velocity.

13. An apparatus for planning a motion for a first vehicle, comprising:
    means for estimating past states of an observed second vehicle based on sensor inputs;
    means for predicting a future trajectory of the second vehicle based on the estimated past states;
    means for planning a future trajectory of the first vehicle based on the predicted future trajectory of the second vehicle and a safety cost function; and
    means for driving the first vehicle to follow the planned trajectory,
    wherein the planned trajectory includes an estimated lane change velocity.

14. The apparatus of claim 13, wherein the future trajectory of the second vehicle is modeled with a cubic spline comprising a 3rd order polynomial.

15. The apparatus of claim 13, wherein the predicting a future trajectory of the second vehicle is based further on a road structure.

16. The apparatus of claim 13, wherein the future trajectory of the first vehicle is modeled with a cubic spline comprising a 3rd order polynomial.

17. The apparatus of claim 13, wherein the future trajectory of the first vehicle is planned based further on at least one of a control smoothness factor, or a road structure, or any combination thereof.

18. The apparatus of claim 13, wherein the means for driving the first vehicle includes:
    means for changing a velocity of the first vehicle, before a lane change, from a start velocity to the estimated lane change velocity; and
    means for changing the velocity of the first vehicle, after the lane change, from the estimated lane change velocity to a target velocity.

19. A non-transitory computer-readable medium comprising code which, when executed by a processor, causes the processor to perform a method comprising:
    estimating past states of an observed second vehicle based on sensor inputs;
    predicting a future trajectory of the second vehicle based on the estimated past states;
    planning a future trajectory of the first vehicle based on the predicted future trajectory of the second vehicle and a safety cost function; and
    driving the first vehicle to follow the planned trajectory,
    wherein the planned trajectory includes an estimated lane change velocity.

20. The non-transitory computer-readable medium of claim 19, wherein the future trajectory of the second vehicle is modeled with a cubic spline comprising a 3rd order polynomial.

21. The non-transitory computer-readable medium of claim 19, wherein the predicting a future trajectory of the second vehicle is based further on a road structure.

22. The non-transitory computer-readable medium of claim 19, wherein the future trajectory of the first vehicle is modeled with a cubic spline comprising a 3rd order polynomial.

23. The non-transitory computer-readable medium of claim 19, wherein the future trajectory of the first vehicle is planned based further on at least one of a control smoothness factor, or a road structure, or any combination thereof.

24. The non-transitory computer-readable medium of claim 19, wherein the driving the first vehicle includes:
    before a lane change, changing a velocity of the first vehicle from a start velocity to the estimated lane change velocity; and
after the lane change, changing the velocity of the first vehicle from the estimated lane change velocity to a target velocity.

* * * * *